United States Patent
Crimpita

(10) Patent No.: US 7,971,608 B2
(45) Date of Patent: Jul. 5, 2011

(54) BREATHABLE LOW PRESSURE ACCUMULATOR

(75) Inventor: Adrian Crimpita, Sterling Heights, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 12/616,887

(22) Filed: Nov. 12, 2009

(65) Prior Publication Data

US 2011/0108148 A1    May 12, 2011

(51) Int. Cl.
*F16L 55/04*    (2006.01)

(52) U.S. Cl. ............. 138/31; 138/30; 138/26; 303/87; 220/721

(58) Field of Classification Search ............. 138/30, 138/31; 303/87; 220/221
See application file for complete search history.

(56) References Cited

U.S. PATENT DOCUMENTS

| | | | | |
|---|---|---|---|---|
| 4,281,679 A * | 8/1981 | Stearns | ............. | 137/515.5 |
| 5,058,961 A * | 10/1991 | Mergenthaler et al. | ..... | 303/115.4 |
| 5,265,943 A * | 11/1993 | Kehl et al. | ............. | 303/87 |
| 5,618,085 A * | 4/1997 | Siegel et al. | ............. | 303/113.1 |
| 5,655,569 A | 8/1997 | Tackett | ............. | 138/30 |
| 5,664,848 A * | 9/1997 | Muraski | ............. | 303/87 |
| 5,735,314 A * | 4/1998 | Alaze et al. | ............. | 138/31 |
| 5,857,753 A * | 1/1999 | Gowda | ............. | 303/116.4 |
| 5,951,121 A * | 9/1999 | Takahashi | ............. | 303/155 |
| 6,003,555 A * | 12/1999 | Sheng | ............. | 138/31 |
| 6,203,117 B1 * | 3/2001 | Starr et al. | ............. | 303/87 |
| 6,390,133 B1 * | 5/2002 | Patterson et al. | ............. | 138/31 |
| 7,347,509 B2 | 3/2008 | Lenz | ............. | 303/87 |

* cited by examiner

Primary Examiner — Patrick F Brinson

(57) ABSTRACT

A breathable low pressure accumulator includes a housing with a cylindrical bore formed therein. A piston slides within the bore and includes an elastic piston head. A biasing member urges the piston towards a first end of the bore. At least one passage communicates between an exterior of the housing and a volume that is enclosed by the bore and the elastic piston head. The elastic piston head is formed of rubber. The elastic piston head is molded into the piston.

19 Claims, 1 Drawing Sheet

BREATHABLE LOW PRESSURE ACCUMULATOR

FIELD

The present disclosure relates to low pressure accumulators which are generally employed in vehicle hydraulic braking systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hydraulic accumulators generally include a piston that fits within a bore. Hydraulic fluid exerts pressure on one side of the piston. A spring or other biasing member acts on the piston in the opposite direction from the hydraulic force. The piston may include a piston ring or seal that seals between the piston and cylinder wall.

Referring now to FIG. 1, a cross-section is shown of a low pressure accumulator (LPA) 10 in accordance with the prior art. LPA 10 includes a cylinder or bore 12 that is formed in a housing 14. A piston 16 fits within bore 12. A spring 18 urges piston 16 towards the bottom of bore 12. A cover 20 closes one end of bore 12. Spring 18 compresses against an interior surface of cover 20. A seal 22 provides a seal between piston 16 and the wall of border 14.

During operation a fluid, such as brake fluid, enters an inlet port 24. The fluid displaces piston 16 upwards thereby compressing spring 18. The fluid can be released through an outlet port 26. Outlet port 26 may include a check valve 28. The volumetric capacity of LPA 10 is limited by the diameter of bore 12 and the stroke of piston 16. Increasing the volumetric capacity of LPA 12 therefore requires increasing the size of LPA 10.

SUMMARY

A breathable low pressure accumulator includes a housing with a cylindrical bore formed therein. A piston slides within the bore and includes an elastic piston head. A biasing member urges the piston towards a first end of the bore. At least one passage communicates between an exterior of the housing and a volume that is enclosed by the bore and the elastic piston head. The elastic piston head is formed of rubber. The elastic piston head is molded into the piston.

In other features the piston also includes a radially outward extending lip at the periphery proximate the elastic piston head, a recess that is formed between the radially outward extending lip and a piston skirt, and a second radial lip that extends radially inward from an outer diameter of the elastic head and that is received in the recess. The biasing member is a spring. A cap closes the bore and presses against the spring. A second passage communicates between the exterior of the housing and the volume that is enclosed by the bore and the elastic piston head. A second passage communicates between the exterior of the housing and the volume that is enclosed by the bore and the elastic piston head. The second passage includes a check valve.

A breathable low pressure accumulator includes a housing with a cylindrical bore formed therein. A piston slides within the bore and includes an elastic piston head. A spring urges the piston towards a first end of the bore. A cap closes a second end of the bore and presses on the spring. A passage communicates between an exterior of the housing and a volume that is enclosed by the bore and the elastic piston head. The piston includes a hollow dome that protrudes into an area between skirts of the piston and includes an elastic piston head that stretches into the hollow dome when fluid is introduced via at least one of the first and second passages.

In other features the elastic piston head is formed of rubber. The elastic piston head is molded into the piston.

In other features the piston includes a radially outward extending lip at the periphery proximate the elastic piston head, a recess that is formed between the radially outward extending lip and a piston skirt, and a second radial lip that extends radially inward from an outer diameter of the elastic head and that is received in the recess. A second passage communicates between the exterior of the housing and the volume that is enclosed by the bore and the elastic piston head. The second passage includes a check valve.

A breathable low pressure accumulator includes a housing with a cylindrical bore formed therein. A piston slides within the bore and includes an elastic piston head. A spring urges the piston towards a first end of the bore. A cap closes a second end of the bore and presses on the spring. A passage communicates between an exterior of the housing and a volume that is enclosed by the bore and the elastic piston head. The piston includes a hollow dome that protrudes into an area between skirts of the piston and includes a rubber piston head that stretches into the hollow dome when fluid is introduced via at least one of the first and second passages.

In other features the piston further includes a radially outward extending lip at the periphery proximate the elastic piston head, a recess that is formed between the radially outward extending lip and a piston skirt, and a second radial lip that extends radially inward from an outer diameter of the elastic head and that is received in the recess.

In other features a second passage communicates between the exterior of the housing and the volume that is enclosed by the bore and the elastic piston head. The second passage includes a check valve.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
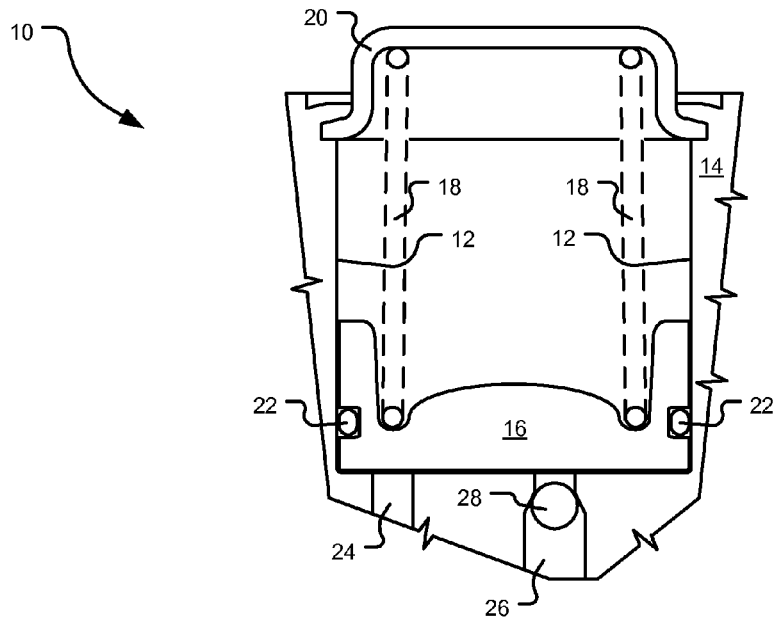
FIG. 1 is a cross-section of a low pressure accumulator (LPA) in accordance with the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Figure 2:
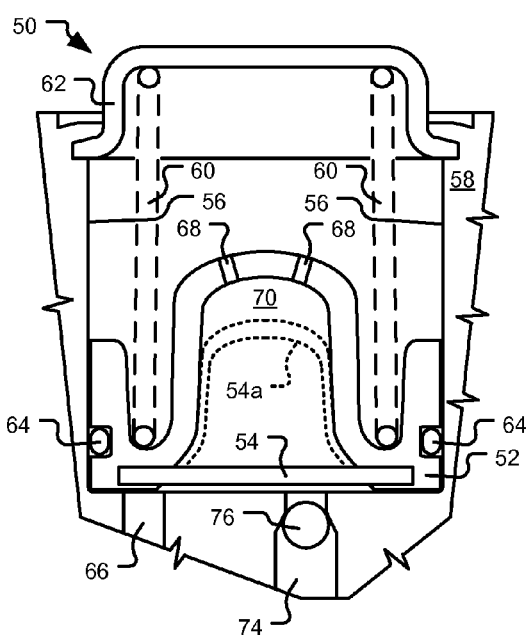
FIG. 2 is a cross-section of a breathable LPA having a first seal design.
Figure 3:
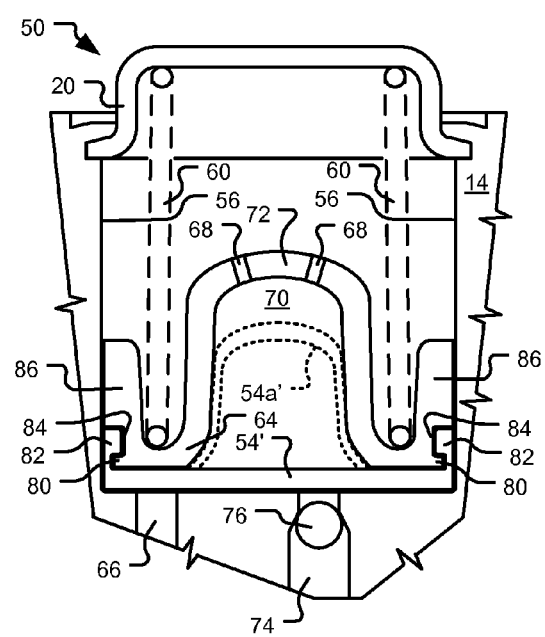
FIG. 3 is a cross-section of a breathable LPA including a second seal design.

Referring now to FIG. 2, a cross-section is shown of a breathable low pressure accumulator (LPA) 50. A piston 52 of LPA 50 includes an elastic head 54. Elastic head 54 allows LPA 50 to provide an increased accumulator volume when compared to prior art LPA 10 with the same bore and stroke.

LPA 50 includes a cylinder or bore 56 that is formed in a housing 58. Piston 52 fits within bore 56. A spring 60 urges piston 52 into bore 56. A cover 62 closes bore 56. Spring 60 compresses against an interior surface of cover 62. A seal 64 provides a seal between piston 52 and the wall of bore 56.

Elastic head 54 can be formed of rubber and have its periphery molded into piston 52. When fluid enters an inlet port 66 it stretches elastic head 54 upwards towards a shape 54*a*. One or more vents 68 allow air or other gas to be displaced from a space 70 that is formed between elastic head 54 and a dome 72 of piston 52.

Accumulated fluid can be released through an outlet port 74. Outlet port 74 may include a check valve 76. Elastic head 54 resumes its undeflected shape as the fluid is released.

Referring now to FIG. 2 an alternate embodiment is shown of LPA 50. The alternate embodiment employs an elastic head 54' that also provides the function of seal 64 (shown in FIG. 2). Elastic head 54' resembles a cover that snaps onto a radial lip 80 which extends from the head of piston 52. A periphery of elastic head 54' includes a second radial lip 82 that extends radially inward from an outer diameter of elastic head 54'. Second radial lip 82 engages a recess 84 that is formed between first radial lip 80 and a piston skirt 86. Recess 84 receives second radial lip 82, which also facilitates sealing between piston 52 and the wall of bore 56.

When fluid enters an inlet port 66 it stretches elastic head 54' upwards towards a shape 54*a*'. One or more vents 68 allow air or other gas to be displaced from a space 70 that is formed between elastic head 54 and a dome 72 of piston 52.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A breathable low pressure accumulator, comprising:
 a housing with a cylindrical bore formed therein;
 a piston that slides within the bore and that includes an elastic piston head, the piston including a piston skirt (86) and a hollow dome (72) that is concentric with and extends into an area that is radially surrounded by the piston skirt and wherein the elastic piston head is proximate an open end of the dome (72);
 a biasing member that urges the piston towards a first end of the bore; and
 at least one passage that communicates between an exterior of the housing and a volume that is enclosed by the bore and the elastic piston head.

2. The accumulator of claim 1 wherein the elastic piston head is formed of rubber.

3. The accumulator of claim 1 wherein the elastic piston head is molded into the piston.

4. The accumulator of claim 1 wherein the piston further comprises:
 a radially outward extending lip at the periphery proximate the elastic piston head,
 a recess that is formed between the radially outward extending lip and a piston skirt; and
 a second radial lip that extends radially inward from an outer diameter of the elastic head and that is received in the recess.

5. The accumulator of claim 1 wherein the biasing member is a spring.

6. The accumulator of claim 5 further comprising a cap that closes the bore and presses against the spring.

7. The accumulator of claim 1 further comprising a second passage that communicates between the exterior of the housing and the volume that is enclosed by the bore and the elastic piston head.

8. The accumulator of claim 1 further comprising a second passage that communicates between the exterior of the housing and the volume that is enclosed by the bore and the elastic piston head.

9. The accumulator of claim 8 wherein the second passage includes a check valve.

10. A breathable low pressure accumulator, comprising:
 a housing with a cylindrical bore formed therein;
 a piston that slides within the bore and that includes an elastic piston head and a piston skirt;
 a spring that urges the piston towards a first end of the bore;
 a cap that closes a second end of the bore and presses on the spring; and
 a passage that communicates between an exterior of the housing and a volume that is enclosed by the bore and the elastic piston head;
 wherein the piston includes a hollow dome that protrudes into an area radially within the piston skirt and that includes an elastic piston head that stretches into the hollow dome when fluid is introduced via the passage.

11. The accumulator of claim 10 wherein the elastic piston head is formed of rubber.

12. The accumulator of claim 10 wherein the elastic piston head is molded into the piston.

13. The accumulator of claim 10 wherein the piston further comprises:
 a radially outward extending lip at the periphery proximate the elastic piston head,
 a recess that is formed between the radially outward extending lip and a piston skirt, and
 a second radial lip that extends radially inward from an outer diameter of the elastic head and that is received in the recess.

14. The accumulator of claim 10 further comprising a second passage that communicates between the exterior of the housing and the volume that is enclosed by the bore and the elastic piston head.

15. The accumulator of claim 14 wherein the second passage includes a check valve.

16. A breathable low pressure accumulator, comprising:
 a housing with a cylindrical bore formed therein;
 a piston that slides within the bore and that includes an elastic piston head and a piston skirt;
 a spring that urges the piston towards a first end of the bore;
 a cap that closes a second end of the bore and presses on the spring; and
 a passage that communicates between an exterior of the housing and a volume that is enclosed by the bore and the elastic piston head;

wherein the piston includes a hollow dome that protrudes into an area radially within the piston skirt and that includes a rubber piston head that stretches into the hollow dome when fluid is introduced via the passage.

17. The accumulator of claim 16 wherein the piston further comprises:

a radially outward extending lip at the periphery proximate the elastic piston head, a recess that is formed between the radially outward extending lip and a piston skirt, and a second radial lip that extends radially inward from an outer diameter of the elastic head and that is received in the recess.

18. The accumulator of claim 16 further comprising a second passage that communicates between the exterior of the housing and the volume that is enclosed by the bore and the elastic piston head.

19. The accumulator of claim 18 wherein the second passage includes a check valve.

* * * * *